United States Patent [19]

Gerhardt

[11] Patent Number: 4,752,936
[45] Date of Patent: Jun. 21, 1988

[54] GAS LASER, PARTICULARLY ION LASER

[75] Inventor: Harald Gerhardt, Langenhagen, Fed. Rep. of Germany

[73] Assignee: Carl-Zeiss-Stiftung, Heidenheim, Fed. Rep. of Germany

[21] Appl. No.: 891,249
[22] PCT Filed: Nov. 12, 1985
[86] PCT No.: PCT/EP85/00601
§ 371 Date: Jul. 15, 1986
§ 102(e) Date: Jul. 15, 1986
[87] PCT Pub. No.: WO86/03065
PCT Pub. Date: May 22, 1986

[30] Foreign Application Priority Data

Nov. 15, 1984 [DE] Fed. Rep. of Germany ... 8433460[U]

[51] Int. Cl.$^4$ .................... H01S 3/07; H01S 3/045
[52] U.S. Cl. ........................ 372/62; 372/35; 372/61; 372/65
[58] Field of Search ............ 372/61, 35, 62, 65

[56] References Cited

U.S. PATENT DOCUMENTS 3,531,734 9/1970 Gordon et al. ............ 372/62
3,763,442 10/1973 McMahan ................ 372/34
3,894,795 7/1975 Laurens ................... 350/319
4,378,600 3/1983 Hobart .................... 372/62

FOREIGN PATENT DOCUMENTS

82/03950 11/1982 PCT Int'l Appl.
1197123 7/1970 United Kingdom.

OTHER PUBLICATIONS

8164 Instruments and Experimental Techniques 27 (1984), Jan.-Feb., No. 1, Part 2, New York, U.S.A., pp. 194-197.

Journal of Physics E: Scientific Instruments, 6(1973), London, Great Britain, "A Demountable Argon Ion Laser of 'All-Metal' Construction", J. C. L. Cornish et al, pp. 880-884.

Zeitschrift für Angewandte Physik, vol. 29, No. 4, 1970, Berlin, Federal Republic of Germany, Schäfer et al.: "Eiin Entladungsrohr aus Cloxierten Al-Segmenten für Ionenlaser", pp. 246-248.

Primary Examiner—James W. Davie
Assistant Examiner—Xuan T. Vo
Attorney, Agent, or Firm—Hopgood, Calimafde, Kalil, Blaustein & Judlowe

[57] ABSTRACT

In a gas laser, in particular an ion laser with a discharge tube arranged between a cathode and an anode, the tube is supported with the aid of several disks in a gas-filled support tube. The support tube is surrounded by an outer tube, and a coolant flows through the outer space formed thereby. In order to achieve effective cooling of the discharge tube, the outer space is divided into a plurality of axially-extending sectors, and the support disks contain channels for the passage of the coolant, the inlet and outlet openings which channels open into respective associated sectors of the outer space. Upon operation of the laser, the coolant flows simultaneously in parallel through all of the support disks which are distributed over the entire discharge tube and thus effects a rapid, effective cooling of the discharge tube. The coolant advantageously circulates in a closed coolant circuit, which comprises a thermostat for controlling the temperature of the coolant.

9 Claims, 4 Drawing Sheets

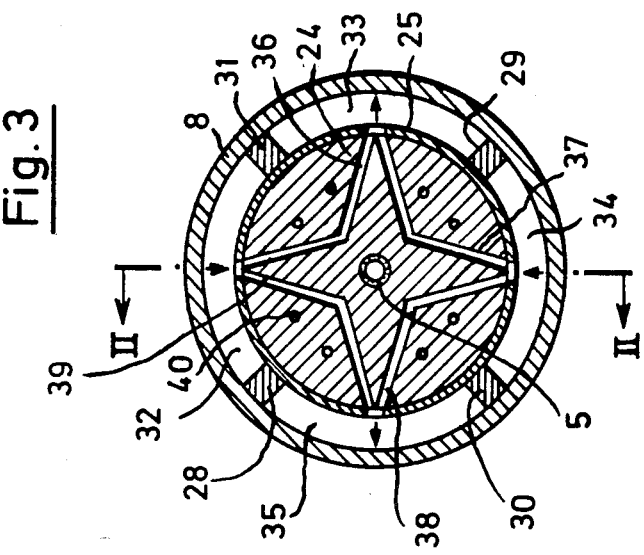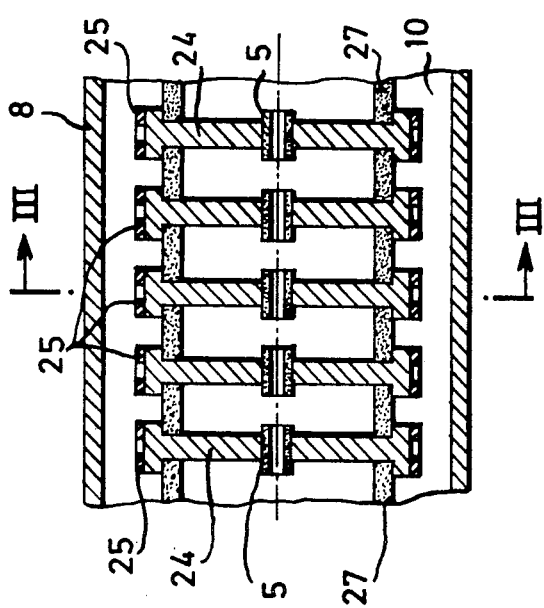

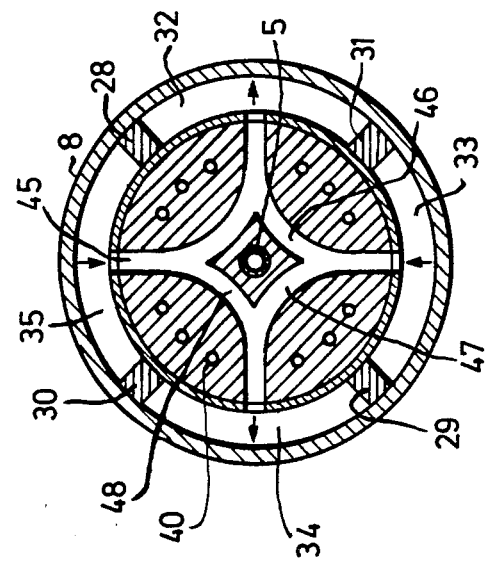
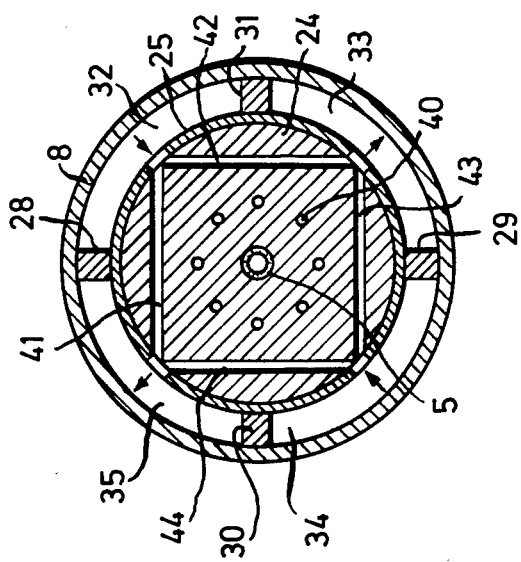

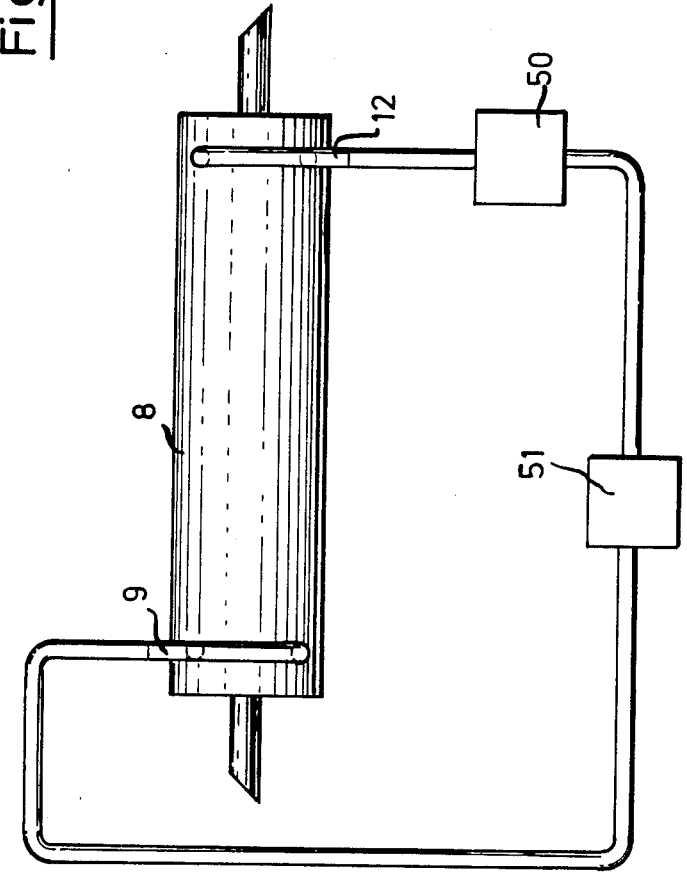

000
GAS LASER, PARTICULARLY ION LASER

BACKGROUND OF THE INVENTION

The present invention concerns a gas laser, in particular an ion laser. In such a laser a plasma discharge in which the atoms or ions of the gas are excited and caused to emit light burns in a gas-filled discharge tube arranged between a cathode and an anode.

The discharge tube of an ion laser becomes very hot in operation, which, among other things, limits the power-handling capacity and life of the laser.

From U.S. Pat. No. 4,378,600 an ion laser is known in which the discharge tube is cooled. In that laser, the discharge tube is supported with the aid of several disks within a gas-filled support tube which is surrounded by an outer tube with a space between. A coolant flows through the outer space formed by these two tubes. The support disks are made of copper and transport the heat by heat conduction from the discharge tube to the support tube. The coolant which flows around the support tube removes the heat from it.

This known ion laser has the disadvantage that the cooling of the discharge tube is not produced rapidly and effectively by heat conduction via the support disks and support tube, so that the temperature of the discharge tube still reaches rather high values.

The object of the present invention is to provide a gas laser, in particular an ion laser, which is characterized by a long life and good reproducibility of the radiation produced.

SUMMARY OF THE INVENTION

In accordance with the invention there is provided a gas laser, in particular an ion laser, comprising gas-filled discharge tube means disposed between a cathode and an anode within a resonant cavity, a gas filled support tube, a plurality of axially spaced disks supporting said discharge tube means within said support tube, said disks having gas passages therethrough, an outer tube surrounding said support tube with a radial space therebetween, means for passing a coolant through said radial space, means disposed in said radial space for subdividing said radial space into a plurality of axially extending circumferential sectors, and channels provided in said disks which channels interconnect different sectors of said plurality of sectors and extend within said disks along paths that approach said discharge tube means for passing coolant therethrough.

In the laser of the invention, the coolant entering a sector of the radial or outer space, flows in parallel through all support disks thus cooling them directly and then flows off over another sector of the outer space. Such a flow of coolant which takes place simultaneously and in parallel through all the support disks which are distributed over the entire length of the discharge tube cools the discharge tube rapidly and effectively by heat exchange. By selection of the coolant and of the speed of flow of the coolant, the cooling can be controlled in such a manner that the discharge tube does not exceed a preselected temperature for a given output of the laser.

It is particularly advantageous, in view of the small cross section of flow, to connect a closed coolant circuit to the corresponding inlet and outlet openings of the laser outer space. If a thermostat is inserted in said circuit then the temperature of the coolant, and thus also the temperature of the discharge tube reached with a predetermined laser output, can be maintained constant.

It is readily apparent that in the laser of the invention a long life of the laser is obtained by the effective cooling of the discharge tube. By suitable selection of the coolant parameters, the laser also permits operation with higher outputs, and does so without reduction of its life as compared with the ion lasers of known construction which are operated with lower outputs. Finally, in the laser of the invention the discharge tube can be acted on by higher currents so that higher output powers than with traditional gas lasers can be obtained with the same dimensions of the laser.

By the effective cooling of the discharge tube, the position and length of the tube in the laser of the invention, remain constant during operation, i.e. the volume of the laser remains constant. In this way, improved stability of the output power and of the spectral distribution of the laser radiation produced is obtained; the laser produces radiation within a stable fundamental mode.

Advantageous further developments of the support disks and of the coolant channels result from supporting the discharge tube means within central bores through the disks. Also, the support disks are made of a material of high thermal conductivity, for instance copper. The disks themselves may suitably consist of a single piece and the coolant channels be formed by boreholes. However, it is also possible to form each disk from two halves if the coolant channels are to have a curved course.

BRIEF DESCRIPTION OF THE DRAWINGS

The invention will be described below in detail, with reference to FIGS. 1 to 5 of the accompanying drawings, in which:

FIG. 2 is a longitudinal section through a part of another embodiment;

FIG. 3 is a section along the line III—III of FIG. 2;

FIG. 4 is a section corresponding to FIG. 3 through another embodiment of a support disk;

FIG. 5 is a section corresponding to FIG. 3 through a further embodiment of a support disk;

FIG. 6 is a diagrammatic view of a laser with closed coolant circuit.

DETAILED DESCRIPTION OF THE PREFERRED EMBODIMENTS

Figure 1:
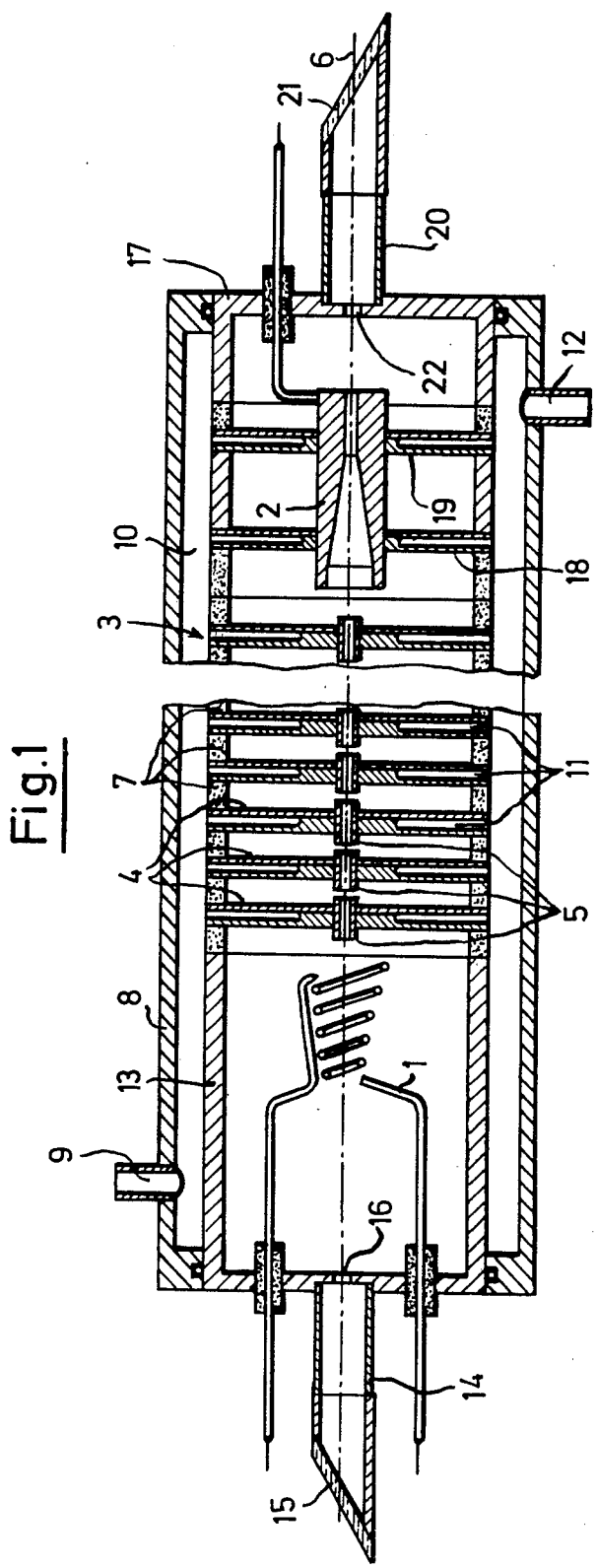
FIG. 1 is a longitudinal section through one embodiment of a laser according to the invention.

In FIG. 1, 1 is a cathode and 2 is the associated anode of the gas laser shown. Cathode 1 and anode 2 are arranged in a support tube 3 which consists of several parts. A plurality of support disks 4 of material of good thermal conductivity form parts of the support tube 3 in the embodiment shown. Each of the support disks 4 has a central borehole in which there is mounted a short length of tube 5. These lengths of tube 5 are all so arranged that their axes are aligned co-linearly with the optical axis 6 of the laser. Together they form the discharge tube.

The support tube 3 is hermetically sealed at its two ends and filled with an active gas, for example argon or krypton. During the operation of the laser, a plasma discharge which extends along the discharge tube 5 burns between cathode 1 and anode 2. The gas in the discharge tube 5 is excited by this discharge. High ion energies occur within the region of the discharge tube 5.

For this reason, the parts 5 of the discharge tube are made of sputter-resistant material, i.e. of material which has the lowest possible removal rate under the high ion energy which occurs. Tungsten, for instance, or else ceramic, such as aluminum oxide or aluminum nitrite, can be used as such material.

The support tube 3 consists of the support disks 4 between each of which a ring 7, consisting for instance of ceramic, is placed. The disks 4 and the rings 7 are connected together, for instance by brazing, so as to produce a hermetic connection.

The support tube 3 is surrounded by an outer tube 8, and a coolant flows from an inlet opening to an outlet opening within the outer space 10 produced thereby. Water, oil or any of the other customary cooling solutions can, for instance, by employed as coolant. The coolant flows not merely over the support tube but also through channels 11 in the support disks 4; i.e. heat exchange with the coolant, which removes the generated heat from the discharge tube 5, takes place over the entire length of the discharge tube 5.

The cathode 1 of the laser is arranged in a cup-shaped part 13 of the support tube 3 into which part there is inserted a length of tube 14 which bears a Brewster window 15. The length of tube communicates via a borehole 16 with the inside of the support tube 3.

The anode 2 is introduced into a cup-shaped part 17 of the support tube 3 and held there by means of two support disks 18, 19 which are provided with channels for the flow of the coolant, in the same way as the support disks 4. A length of tube 20, which also bears a Brewster window 21, is introduced into the part 17. The length of tube 20 is connected with the inside of the support tube 3 via a borehole 22.

In the embodiment shown in FIG. 2, support disks 24 of copper are provided which support the pieces 5 of the discharge tube within a central bore. The outer periphery of the support disks 24 is thickened annularly and surrounded by a ring 25 of a material of low thermal expansion, for example stainless steel. Annular ceramic parts 27 are inserted between the support disks 24. These ceramic parts are metalized at least on the edges of their outer periphery and are brazed along their horizontal contact surface to the annularly thickened edge of the support disks 24. The outer ring 25 serves to see to it that the gap between the ring 27 and the thickened part of the disk 24 does not become too large during the brazing process.

As shown in FIG. 3, the outer space 10 between the outer tube 8 and the support tube 3 is divided into four sectors 32, 33, 34, 35 by axially extending parts 28, 29, 30, 31. Each support disk 24 is provided with boreholes which extend in the direction towards the discharge tube 5 and together form a plurality of coolant channels 36, 37, 38, 39. In the embodiment shown, the coolant channel 36 is provided from the chamber 32 with coolant which enters the cooling channel 36 in the direction indicated by the arrow and leaves it in the sector 33. Each of the sectors 32 and 34 is provided with an inlet opening for the coolant, while each of the sectors 33 and 35 has an outlet opening. The support disks 24 are furthermore provided with boreholes 40 which permit the flow of gas between the individual regions of the support tube 3 which are separated from each other by the disks 24.

In the embodiment shown in FIG. 4, the coolant channels are formed by linearly extending boreholes 41, 42, 43, 44. This embodiment is easier to manufacture than that of FIG. 3, but is not as effective for cooling as the latter.

In the embodiment shown in FIG. 5, four coolant channels 45, 46, 47, 48 are provided, which have a curved course and thus approach very close to the discharge tube 5. Such cooling channels can no longer be produced by drilling a solid part so that each support disk 24 consists in this example of an assembly of two halves.

The gas laser of the invention which is shown in the figures has a relatively high gas density, in view of the effective cooling by the support disks 4, in the storage region to the side of the discharge tube 5. In this way, so-called gas pumping is reduced and the impurities produced thereby are less numerous. As can be noted from the figures, the gas passage boreholes 40 in the disks 4 and 24 have a smaller diameter than the central borehole which serves to receive the discharge tube 5.

In the embodiments shown, the discharge tube is in each case formed by the assembly of individual pieces 5. However, it is also possible to form the discharge tube from a single piece which is held in the support disks 4 and 24. Such a single-piece gas tube will be provided with gas passage openings perpendicular to its axis.

Ordinarily, in the laser of the invention there is used a coolant which is not electrically conductive and which circulates in closed coolant circuit in accordance with the embodiment shown in FIG. 6. In FIG. 6, this circuit has been shown diagrammatically, 50 being a circulating pump and 51 a thermostat which serves to maintain the coolant at a predetermined temperature.

Ordinary water can, of course, also be used as coolant, in which case it is then necessary to cover the parts which are under voltage with an insulating layer.

I claim:

1. A gas laser, in particular an ion laser, comprising gas-filled discharge tube means disposed between a cathode and an anode within a resonant cavity, a gas filled support tube, a plurality of axially spaced disks supporting said discharge tube means within said support tube, said disks having gas passages therethrough, an outer tube surrounding said support tube with a radial space therebetween, means for passing a coolant through said radial space, means disposed in said radial space for subdividing said radial space into a plurality of axially extending circumferential sectors, and channels provided in said disks which channels interconnect different sectors of said plurality of sectors and extend within said disks along paths that approach said discharge tube means for passing coolant therethrough.

2. A gas laser according to claim 1, wherein each of said disks has a central through bore in which said discharge tube means is mounted.

3. A gas laser according to claim 1, wherein said gas passages consist of through bores separated from said channels which bores extend through said disks in the same direction as the discharge tube axis.

4. A gas laser according to claim 1, wherein said discharge tube means consist of a unitary structure containing a plurality of radially directed bores for passage of gas.

5. A gas laser according to claim 1, wherein said discharge tube means consists of a plurality of co-linearly disposed, axially spaced apart, short tubes, each mounted within an axially oriented central bore through a respective one of said disks.

6. A gas laser according to claim 1, wherein said gas filled support tube comprises a plurality of co-linearly disposed, axially spaced apart, rings of electrically insulative material, with each of said disks located between two adjacent rings, all centered about a common axis, said rings and disks being joined hermetically.

7. A gas laser according to claim 6, wherein said electrically insulative material is a ceramic material.

8. A gas laser according to claim 1, wherein said means for passing a coolant through said radial space comprises inlets and outlets for said sectors, and said inlets and outlets are interconnected to couple said sectors with said channels in a closed coolant circuit.

9. A gas laser according to claim 8, wherein said coolant circuit includes thermostatically controlled means for maintaining constant the temperature of coolant being circulated through said coolant circuit.

* * * * *